(12) United States Patent
Niemczyk

(10) Patent No.: US 8,562,250 B2
(45) Date of Patent: Oct. 22, 2013

(54) METHOD FOR INJECTING SURFACE WATER INTO THE GROUND

(76) Inventor: Andrew Niemczyk, Southfield, MI (US)

( * ) Notice: Subject to any disclaimer, the term of this patent is extended or adjusted under 35 U.S.C. 154(b) by 584 days.

(21) Appl. No.: 12/757,115

(22) Filed: Apr. 9, 2010

(65) Prior Publication Data

US 2010/0260547 A1 Oct. 14, 2010

Related U.S. Application Data

(63) Continuation-in-part of application No. 11/980,304, filed on Oct. 30, 2007, now abandoned.

(60) Provisional application No. 61/212,893, filed on Apr. 16, 2009.

(51) Int. Cl.
*E02B 11/00* (2006.01)

(52) U.S. Cl.
USPC .............................. 405/48; 405/50; 405/43

(58) Field of Classification Search
USPC .............................. 405/43, 44, 45, 47, 48, 50
See application file for complete search history.

(56) References Cited

U.S. PATENT DOCUMENTS

| | | | | |
|---|---|---|---|---|
| 3,965,686 A | * | 6/1976 | Saito et al. | 405/43 |
| 4,045,964 A | * | 9/1977 | Barclay | 405/50 |
| 4,246,305 A | * | 1/1981 | Delattre | 405/50 |
| 4,622,138 A | * | 11/1986 | Wager | 405/50 |
| 4,650,367 A | * | 3/1987 | Dietzler | 405/45 |
| 5,037,240 A | * | 8/1991 | Sherman | 405/50 |
| 5,056,281 A | * | 10/1991 | McCarthy | 405/45 |
| 5,249,885 A | * | 10/1993 | Florence | 405/44 |
| 5,316,410 A | * | 5/1994 | Blume | 405/45 |
| 5,444,950 A | * | 8/1995 | Kelly et al. | 405/50 |
| 5,934,828 A | * | 8/1999 | Hu et al. | 405/43 |
| 7,290,958 B2 | * | 11/2007 | Blackwood | 405/50 |
| 2008/0025795 A1 | * | 1/2008 | Purnell | 405/36 |

FOREIGN PATENT DOCUMENTS

| | | | |
|---|---|---|---|
| FR | 2569215 A1 | * | 2/1986 |
| WO | WO 2005/060499 | | 7/2005 |

* cited by examiner

*Primary Examiner* — Frederick L Lagman
(74) *Attorney, Agent, or Firm* — John R. Benefiel

(57) ABSTRACT

A method and pumping/drainage channel member for injecting surface water into the soil beneath a ground area includes drilling a series of holes and inserting an elongated pumping/drainage members into each hole extending downwardly into the soil. The pumping/drainage channel members comprise a cluster of integrally joined channel features each formed with a lengthwise extending slot opening. Surface water flows to the pumping/drainage member, enters the channels and drains down the pumping/drainage members to enhance water movement down into the soil to reduce runoff and help to recharge acquifers. Longer members may be installed between shorter members in a pattern to achieve more rapid injection of water deep into the subsoil.

17 Claims, 5 Drawing Sheets

METHOD FOR INJECTING SURFACE WATER INTO THE GROUND

CROSS REFERENCE TO RELATED APPLICATIONS

This application is a continuation-in-part of U.S. application Ser. No. 11/980,304 filed on Oct. 30, 2007, now abandoned and also claims the benefit of U.S. provisional application No. 61/212,893 filed on Apr. 16, 2009.

BACKGROUND OF THE INVENTION

This invention concerns injection of surface water into the subsoil. Rainwater typically partially percolates into the soil but a greater portion runs off and evaporates to an extent which depends on the slope of the land. The runoff can create flooding in low lying areas. Standing surface water can result where the rate of percolation is insufficient and can be a problem particularly if collecting around buildings where it can enter basement spaces.

Grading is commonly used to direct surface water away from the building. Drain titles are usually laid around the foundation footings to prevent water from collecting around the foundation by draining it away through the tiles.

These measures are sometimes ineffective primarily due to particular soil conditions, the topography of the land, etc.

The water which runs off and/or evaporates could be used to mitigate drought condition if captured and retained by the subsoil as it would migrate to the upper levels of the soil when dry conditions prevail tending to mitigate drought. Greater recharging of aquifers could result if greater absorption could be achieved of runoff by faster rates of water percolation into the soil.

French drains and drywalls are sometimes used to dry limited areas with porous soil, but this approach is inadequate for larger areas and with heavy soils.

It is the object of the present invention to inject surface water into the subsoil to eliminate wet conditions produced by standing surface water or flooding due to runoff, thereby reducing run off and evaporation of surface water by accelerating the rate of water absorption into the subsoil.

SUMMARY OF THE INVENTION

The above object and other objects which will become apparent upon a reading of the following specification and claims are achieved by drilling a pattern of holes into the ground and installing specially configured elongated channel members into holes drilled into the soil, each hole receiving a channel member. The channel members are sufficiently rigid to be inserted into the drilled holes in the ground. The channel members promote movement of water down into the subsoil by the provision of lengthwise channel features clustered around a central core which are open to the outside through lengthwise slots to allow water in the soil to enter into the channel features and flow downwardly. The channel features each have a curving flexible wall extending radially outward from an attached central core and curving circumferentially to an end portion which curves radially back inward towards the central core but terminating before reaching the central core, to form a lengthwise slot extending into a partially confined space defined by the curving wall, the wall able to be compressed substantially by ground pressure to reduce the volume in the partially confined space and create a pumping action when the wall is released as the ground contacts. The channel features are maintained clear of soil as the ground expands and contracts by deflection of the flexible walls defining the channel features to block entrance of soil and by water flowing down the channels flushing out the channel features.

The channel members may be arranged in clusters formed by a repeating pattern of three members with two shorter members arranged on either side of a longer member. The shorter members are long enough to reach a level preferably four feet below the ground from a capped top end located a short distance below grade to allow some water filtration by the over layer of soil before entering the channels. The shorter members promote water absorption of surface water into the upper levels of the soil. The intermediate longer length channel members have a capped top end which may be located at the approximate level of the bottom ends of the shorter members to receive water in the soil collecting around the bottom end of the shorter members by movement down the channels.

As noted, the channel features are open to the outside by lengthwise slots allowing water to enter the channels all along the length of the channel members and which rapidly drains down through the channel features to a lower subsoil level to enhance absorption of water into the subsoil so that the channel members act as drainage members. This dries the soil in a depression cone pattern around the channel members to quickly absorb standing water at the surface of the soil.

The moisture absorbed in the upper layer of the soil drains into the upper region of the longer members and fills up the lengthwise channel features. The resulting water columns in the channel features create increased water pressure at the bottom of the channels injecting water into the soil at the bottom end. In addition, as the surrounding soil becomes wetted, it expands and compresses the channel defining curved wall portions of the channel features, which are deflected inwardly since made of a durable deflectable plastic, reducing the space defined within the channel features, creating additional pressure tending to force the water in the upper part therein down and to be injected out from the lower part of the longer channel members and into the subsoil, thus also functioning as pumping members.

As water exits the lower regions of the features, a vacuum develops in the upper section of the channel features which tends to draw in water from the surrounding soil in the upper regions of the longer members which speedily drains down to the lower regions of the members and is injected into the surrounding soil.

This water movement also keeps the channel features free from soil and debris, to provide a self cleaning action eliminating any maintenance burden.

Thus, surface water is rapidly injected deep into the ground at the lower ends of the channel members.

The inwardly curving wall portions defining the channel features of the channel members are deflectable inwardly in response to increased soil moisture and will expand outwardly as the soil dries out to minimize silting up of the channel features.

When the soil dries out during dry conditions, moisture vapor rises up the channel features and disseminates out into the soil surrounding the upper ends of the channel members to provide moisture transmission from the subsoil to the surface soil but does not form any surface puddles or standing water.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
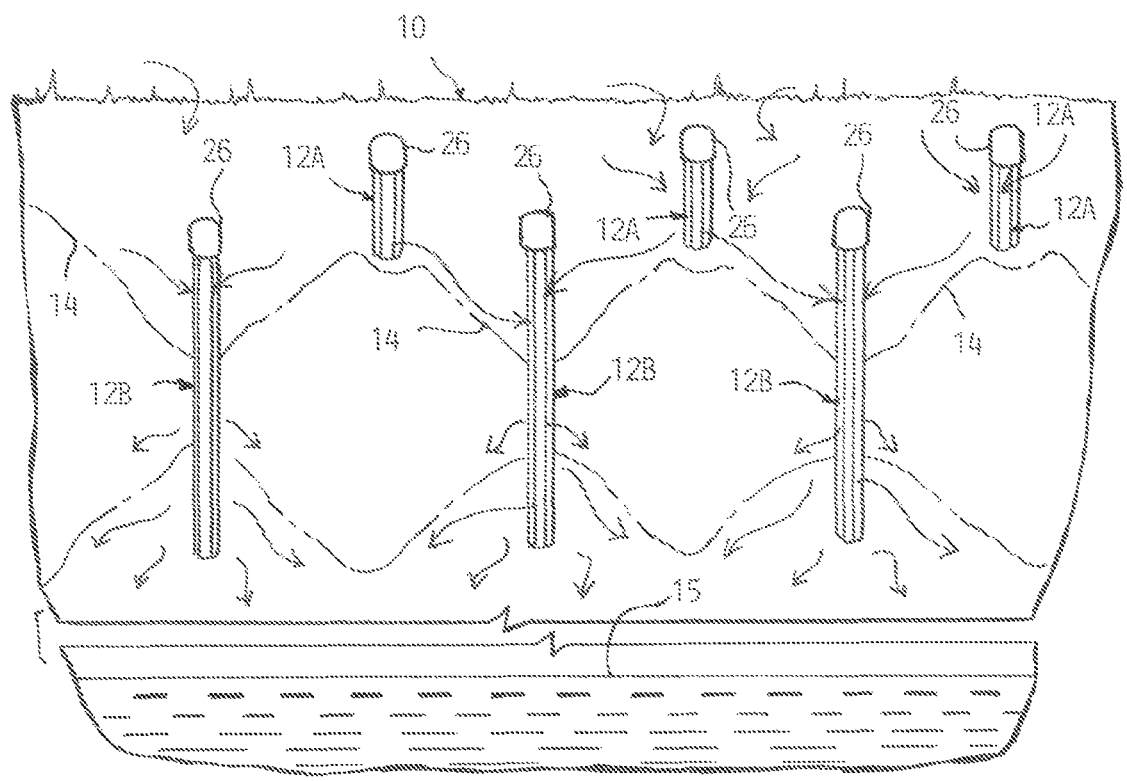
FIG. 1 is a sectional view through a soil region in which an array of channel members have been installed in predrilled holes.
Figure 2:
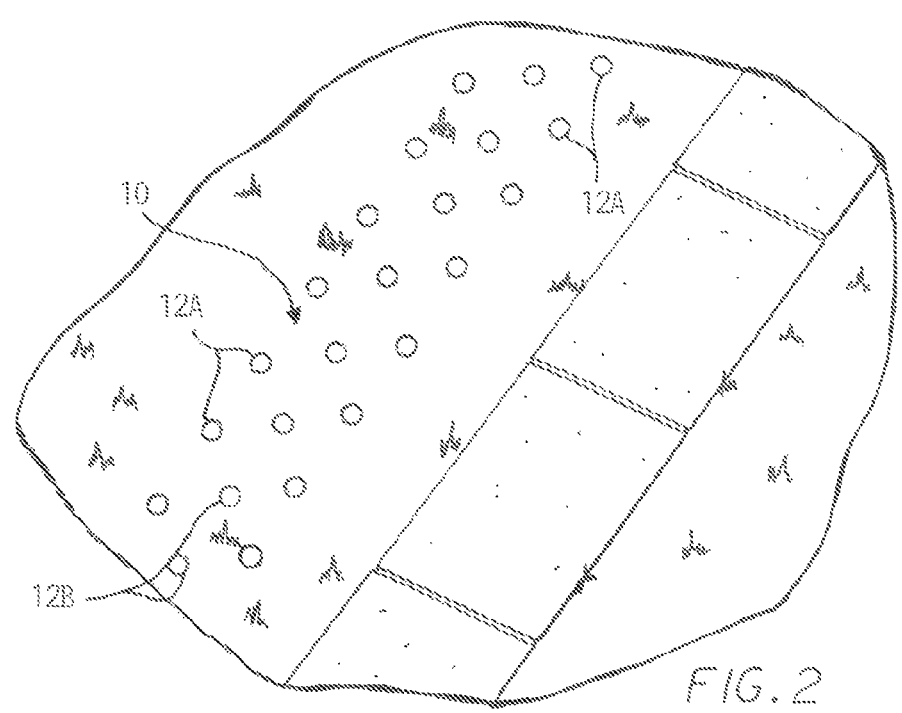
FIG. 2 is a diagram of a pattern of channel members installed adjacent to a paved area.

Referring to FIGS. 1 and 2, a ground area 10 has been prepared so as to speed the rate water movement down into the soil according to the method of the present invention. This preparation comprises installing an array of elongated channel members 12A, 12B into predrilled holes dispersed over the ground area 10. Preferably, these channel members 12A, 12B are arranged in a pattern, with rows of shorter members 12A on either side of The members 12A, 12B are located in the vadose zone well above the level of the water table 15, as the surface water should be completely purified by passing through a sufficient depth of soil prior to reaching the water table level to avoid contamination of the ground water.

Figure 9:
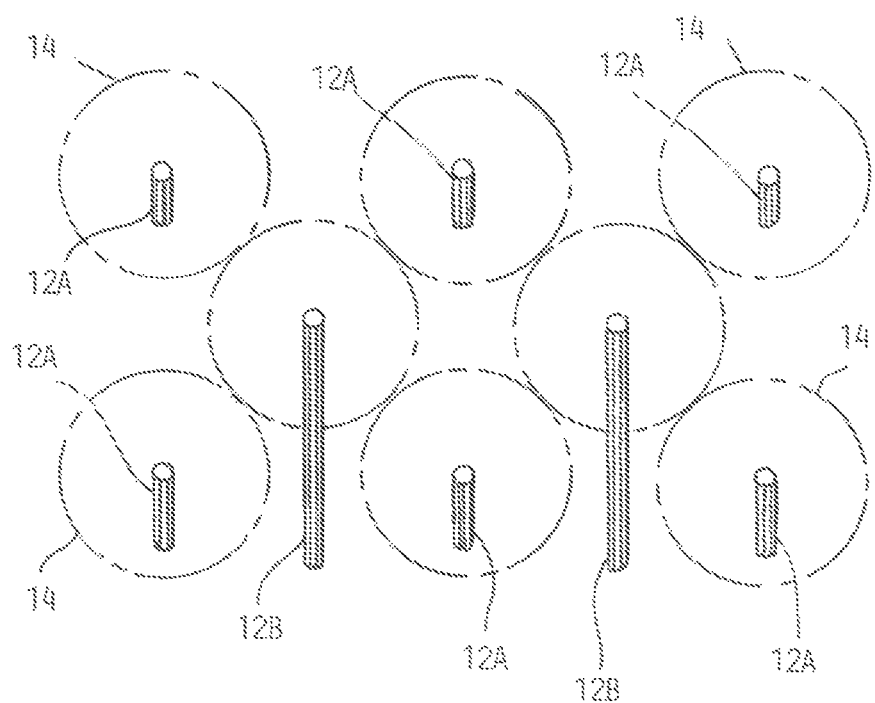
FIG. 9 is a diagrammatic plan view of successive three-channel member cluster installations.

The spacing of the members 12A, 12B depends on the soil drainage characteristics, i.e., further apart for more open soils, closer together for denser soils such that conical zones 14 having a desired rate of percolation are tangent to each other as seen in FIG. 9.

The channel members 12A, 12B are of similar shape, only being of different length. The channel members 12A, 12B are preferably made of a plastic extrusion, a flexible preferably polyethylene plastic being suitable for the purposes of the invention, as it is resiliently deflectable, chemically inert so as to not degrade in the soil, and has a smooth finish to resist capture of debris.

Figure 4:
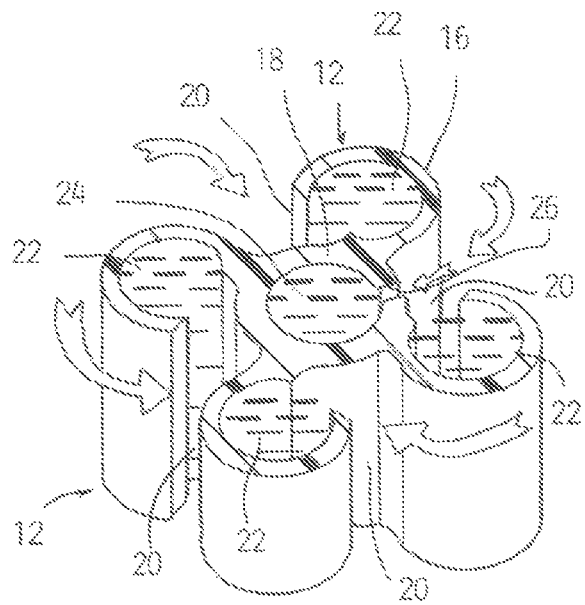
FIG. 4 is an enlarged sectional view of a channel member in which water is collected in the channel features.
Figure 6:
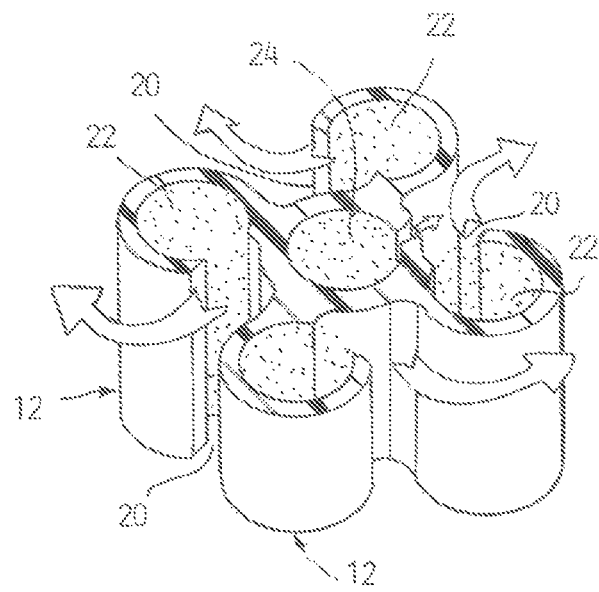
FIG. 6 is an enlarged sectional view of a channel member depicting the flow of water vapor out therefrom.

Each channel member 12A, 12B as best seen in FIGS. 4 and 6 is shaped to have a plurality readily deflectable portions 16 extending radially out from an annular center 18 and curving back towards the center, terminating short of the center to form a lengthwise slot 20, a plurality of channels 22 thereby formed around the center.

A central hollow 24 is opened by a lengthwise radial slot 26 to allow the entrance and exit of ground water as the slots 20 do for channels 22.

Each of the channel members 12A, 12B has a cap 26 at its upper end shown to close off the channel features 22, 24 at their upper ends for a purpose to be described below.

The short channel members 12A, are inserted in the shallow drilled holes at a depth such as to locate their upper end a few inches below the surface of the soil as The members 12A being below grade are not directly exposed to fire damage, but polyethylene can withstand temperatures up to 200° F. and will not crack at temperatures down to −30° F. so the members are quite resistant to damage.

The water in the surface layer of soil drains into the shorter channel members 12A and fills the channel features 22 and 24 as indicated in FIG. 4.

The soil which is saturated therefore extends deeper in the ground around the members 12A. When the ground is saturated with water, the portions 16 are compressed by the soil tending to force the water down the channel features 22, 24, and also avoid silting in of the channel features 22, 24 as will be discussed later.

Figure 3:
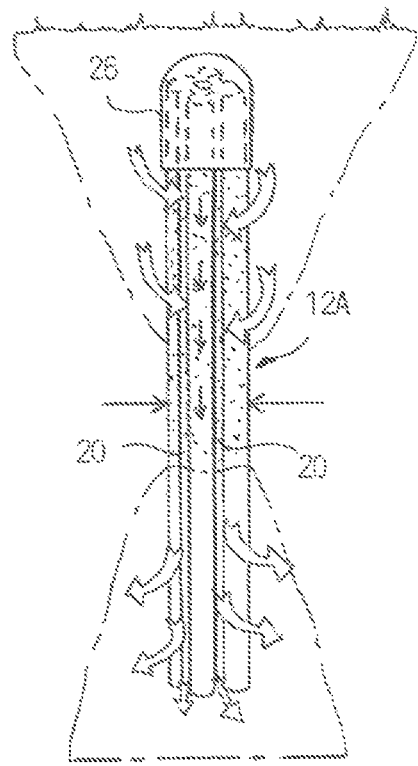
FIG. 3 is a diagram of the moisture flow patterns around and down pumping/drainage channel members according to the invention installed in wet soil conditions.

The water drains down to fill the channel features 22, 24 which creates a pressure head at the bottom of each channel feature 22, 24 which creates a pressure tending to inject water out from the channel features 22, 24 into the surrounding soil around and beneath the lower end of the shorter members 12A, in the cone shaped regions indicated in FIG. 3. This will cause a slight vacuum to develop at the upper end of the member 12A which acts to draw in water out of the surrounding soil and thereby enhance the percolation rate of water out of the surrounding soil and into the channel upper regions.

The net effect is a substantially increase in the rate of injection of water into the subsoil.

FIG. 4 represents the process of drawing moisture out of the subsoil when dry conditions prevail at the surface regions of the soil.

Water vapor passes into the channel features 22, 24 and rises to the upper regions of the members 12A and passes out of the channel feature slots 22, 26 into the surrounding soil.

These processes are repeated with the longer channel members 12B, the upper ends receiving the moisture drawn down in the upper members 12A so as to cause water injection deep into the ground, as indicated in FIG. 1.

The pattern of channel members 12A, 12B should be spaced from paved areas as indicated in FIG. 2, a distance on the order of 7 feet.

Figure 7:
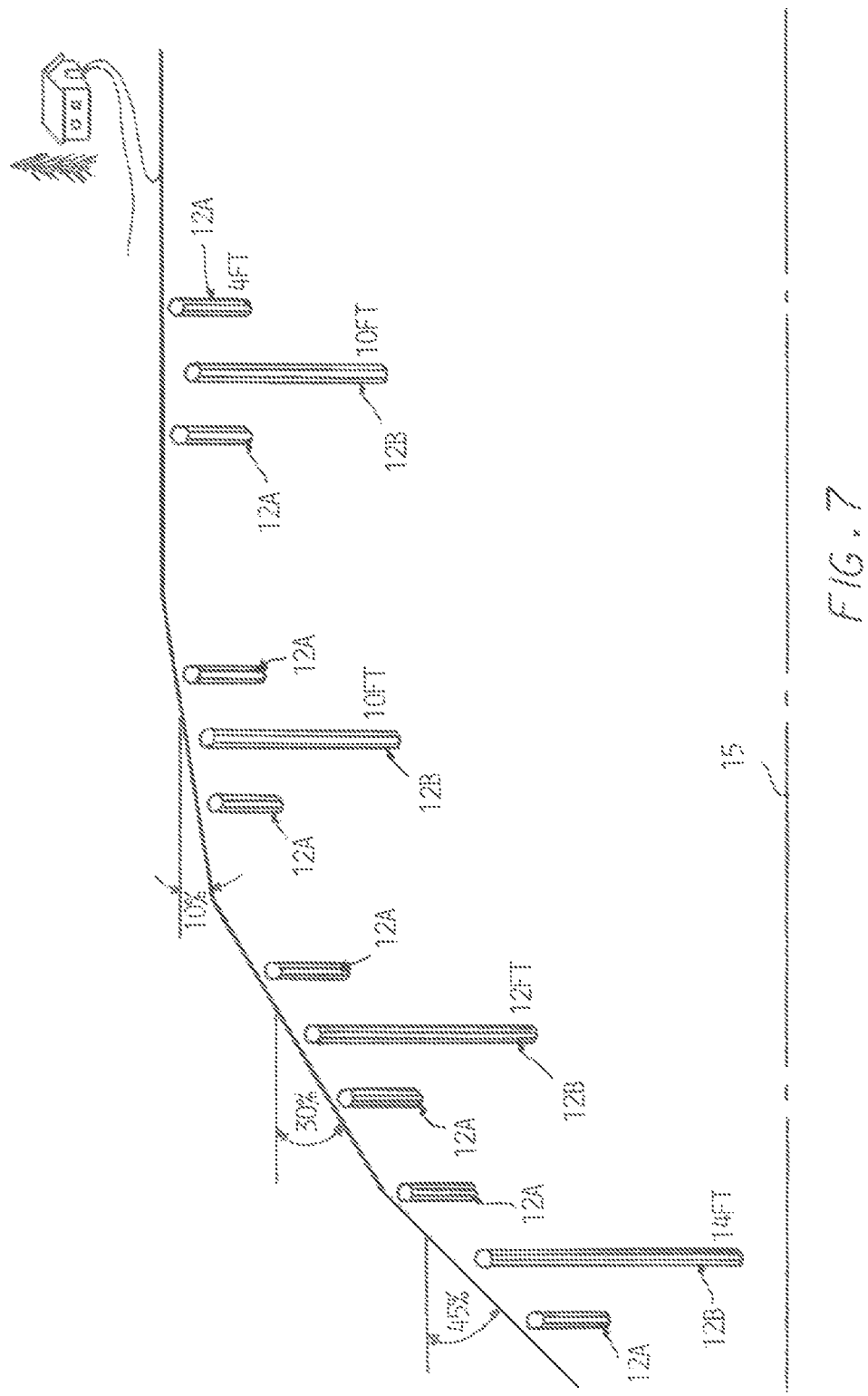
FIG. 7 is a sectional diagram of a varying slope ground in which clusters of channel members are installed increasing length and depths as the ground slope increases.

FIG. 7 shows application of the method to ground areas having steeply sloping grades. In this application, the longer members 12B are lengthened as the slope increases to insure that surface water quickly reaches greater depths so as to avoid landslides which could occur if the uppermost regions become saturated.

The method quickly drains the upper soil regions and causes the surface water to quickly reach sufficiently deep levels so as to avoid landslides from complete saturation of the soil in the surface strata.

Water is thus retained in the soil that would otherwise be lost. Aquifers can be replenished at a greater rate, and flooding problems mitigated by reducing peak-flow runoff. Most surface water discharges can be quickly absorbed over large land areas.

The holes are predrilled so as to allow easy insertion therein of the pumping/drainage channel members 12A, 12B.

Figure 8:
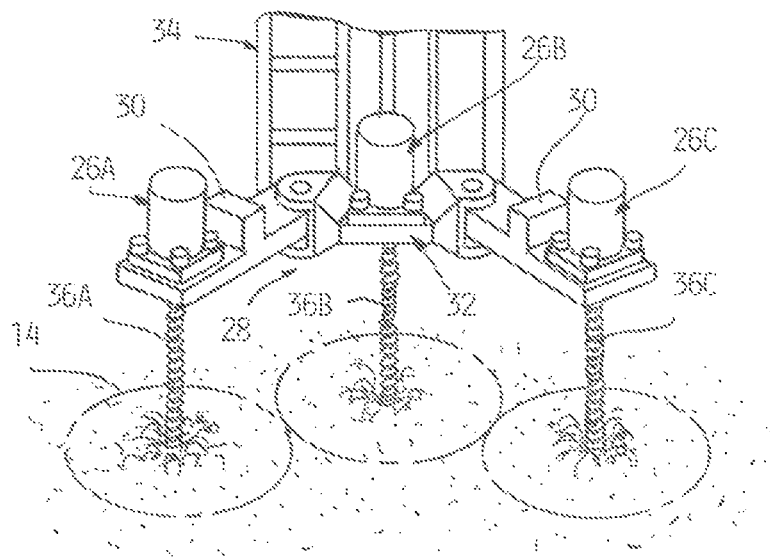
FIG. 8 is a pictorial view of a drilling rig for simultaneous drilling of successive three hole cluster patterns for installation of the channel members according to the invention.

Advantageously, multiple holes are drilled in clusters to make a uniform pattern easier to achieve. FIG. 8 shows a rig having three hydraulic drill motors 26A, 26B 26C movably mounted on a frame 28. The frame 28 includes two swing arms 30 mounting two of the motors 26A, 26C with the third motor 26B mounted to a central fixed member 32. The arms 30 can be adjustably swung in and out to set a particular hole spacing necessary to achieve a desired pattern. A wider spacing hole pattern can be drilled for porous soils, or holes spaced closer together for less porous soils.

The frame 28 is vertically movable on an upright support 34 to the depth of the deepest holes to be drilled, i.e., 10 to 16 feet or greater. The support 34 is mounted to a wheeled carriage (not shown) to be quickly positionable over each successive ground area to be drilled.

The two outer motors 26A, 26C drive relatively short drill bits 36A, 36C corresponding to the shorter channel members 12A while central motor 26B drives a longer drill bit 36B corresponding to the deepest hole accommodating the long channel member 12B.

Figure 13:
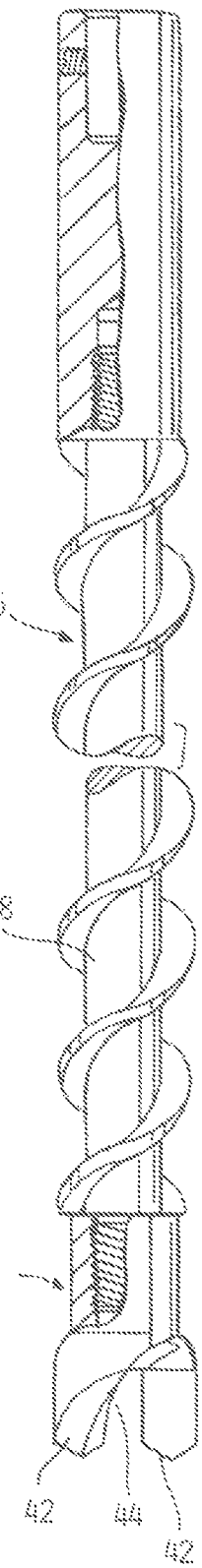
FIG. 13 is a fragmentary side elevational view of a preferred drill configuration for use in drilling holes to receive the channel members.

The drill bits 36A, 36B preferably form holes by moving the soil radially and to be packed rather than by removing soil to the surface as per a conventional auger. This prevents cave in of the holes A large diameter solid steel rod 30 (FIG. 13) has a spiral flange welded thereto pitched to force soil radially outward. A drill tip 40 is threaded to the free end of the drill bits 36A, 36B with radially separated tips 42 located adjacent surfaces 44 which push the soil outwardly to be packed against the hole sidewall in forming the hole.

The holes so drilled have much greater stability against cave in, allowing the members 12A, 12B to be readily inserted therein.

The channel members 12A, 12B are preferably made as plastic extrusions. The shape shown can be produced with careful cooling of the shape exiting the extruder such as to stabilize the shape after exiting the die.

The walls are stiff but resiliently deflectable under pressure as described above.

Figure 10:
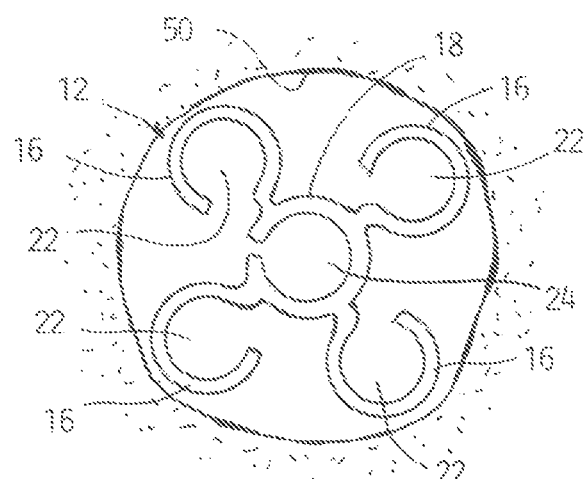
FIGS. 10-12 are enlarged sectional views of a channel member installed in a ground hole with varying degrees of compression by varying degrees of moisture levels in the surrounding soil.
Figure 11:
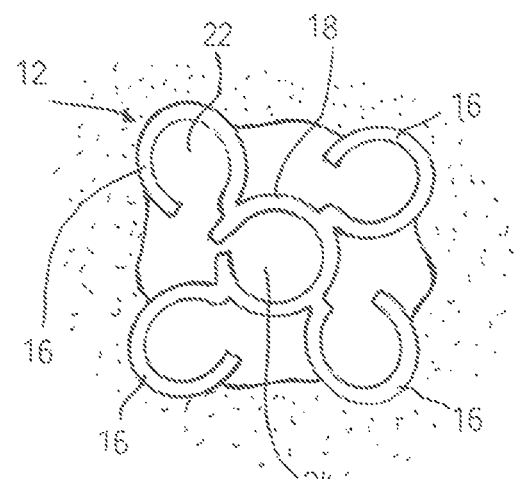
Figure 12:
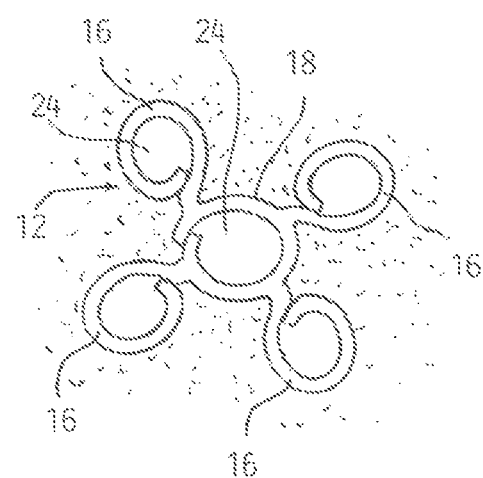

FIGS. 10-12 show the deflections undergone when the surrounding soils becomes progressively more moist.

In FIG. 10, the member is fit into the hole 50 which approximately, one and one half inches in diameter to accommodate the members.

In FIG. 11 the hole 50 has become smaller as the soil has absorbed moisture and the curved wall portions 16, 18 are further deflected inwardly.

In FIG. 12, the wall portions 16, 18 are further deflected inwardly.

This tends to keep soil from silting up in the channels 22, 24.

As the soil dries out the curved wall portions expand back out.

Thus, the rate of absorption of surface water deep into the soil is greatly accelerated by the injection process described to prevent standing water or saturation of the top soil layers, reducing loss of water by runoff and evaporation, achieving the benefits described above.

The invention claimed is:

1. A method of injecting surface water into soil beneath a ground area comprising:

installing a series of elongated channel members into a series of holes formed extending into the ground, said channel members having a series of lengthwise extending channel features defined therein opening to the outside of the members, said channel features each have a curving wall extending radially outward from an attached central core and curving circumferentially to an end portion curving radially back inward towards said central core but terminating before reaching said central core, to form a lengthwise slot extending into a partially continued space defined by said curving wall, said wall able to be compressed substantially by ground pressure to reduce the volume in said partially confined space and create a pumping action extending said channel members to a substantial depth below grade, further including installing a pattern of shorter and longer length channel members into said ground area, with the longer members upper ends installed at a depth in the area of a bottom end of each of said shorter members, whereby soil moisture tends to enter said channel features formed therein and drain downwardly through said channel features to inject water into the soil around said channel member lower ends.

2. The method according to claim 1 further including blocking the top end of each of said pumping/drainage channel members to create a vacuum in the channel features at the top end as water at the bottom end moves out into the surrounding soil.

3. The method according to claim 2 including forming said channel members of a polyethylene plastic.

4. The method according to claim 1 wherein said members are installed extending substantially vertically into the soil.

5. The method according to claim 1 wherein said channel members are installed by drilling corresponding member holes into the ground and inserting one of said channel members into a respective one of said holes.

6. The method according to claim 5 wherein said a plurality of holes are drilled simultaneously in a predetermined pattern and said pattern is repeated along successive regions of said ground areas.

7. The method according to claim 1 further including installing a pattern of shorter and longer channel members into said ground area, with the longer members upper ends installed at a depth in the area of a bottom end of each of said shorter members.

8. The method according to claim 7 wherein said longer channel members are installed deeper into a sloping ground area to cause rapid water injection deeper into the subsoil as the slope increases.

9. The method according to claim 7 wherein clusters of two spaced apart shorter members and a longer member between said two shorter members are installed into successive portions of said ground area.

10. An elongated drainage member comprised of a polyethylene plastic formed with a cluster of integrally joined lengthwise extending channel features, each channel feature said channel features each have a curving wall extending radially outward from an attached central core and curving circumferentially to an end portion curving radially back inward towards said central core but terminating before reaching said central core, to form a lengthwise slot extending into a partially continued space defined by said curving wall, said wall able to be compressed substantially by ground pressure to reduce the volume in said partially confined space and create a pumping action extending.

11. The drainage member according to claim 10, wherein said central core comprises a generally tubular portion also having a lengthwise extending slot opening out to a space between two of said channel features, said central tubular portion surrounded by said cluster of channels.

12. A method of injecting surface water into soil beneath a ground area comprising:

installing a series of elongated channel members into a series of holes formed extending into the ground, said channel members having a series of lengthwise extending channel features defined therein opening to the outside of the members, said channel members extended to a substantial depth below grade, further including installing a pattern of shorter and longer channel members into said ground area, with the longer channel member upper ends installed at a depth in the area of a bottom end of each of said shorter members, whereby soil moisture tends to enter said channels formed therein and drain downwardly through said channels to inject water into the soil around said channel member lower ends, further including installing a pattern of shorter and longer channel members into said ground area, with the longer members upper ends installed at a depth in the area of a bottom end of each of said shorter members.

13. The method according to claim 12 wherein said longer channel members are installed deeper into a sloping ground area to cause rapid water injection deeper into the subsoil as the slope increases.

14. The method according to claim 12 wherein clusters of two spaced apart shorter channel members and a longer channel member between said two shorter members are installed into successive portions of said ground area.

15. An elongated drainage member comprised of a polyethylene plastic formed with a cluster of integrally joined lengthwise extending channel features, each channel feature having a lengthwise extending slot opening to the outside; a central, generally tubular portion also having a lengthwise extending slot opening out to a space between two of said channel features, said central portion surrounded by said cluster of channel features.

16. The member according to claim 15 wherein said channel member is constructed of extruded polyethylene.

17. The drainage member according to claim 15 wherein the upper end of said pumping/drainage member is capped off.

* * * * *

UNITED STATES PATENT AND TRADEMARK OFFICE
CERTIFICATE OF CORRECTION

PATENT NO.         : 8,562,250 B2                                             Page 1 of 1
APPLICATION NO.    : 12/757115
DATED              : October 22, 2013
INVENTOR(S)        : Andrew Niemczyk It is certified that error appears in the above-identified patent and that said Letters Patent is hereby corrected as shown below:

In the Specification

Column 3, line 46 after "12A on either side of" insert -- an intermediate row of longer pumping/drainage channel members 12B. This pattern can be repeated laterally as necessary. --.

Figure 5:
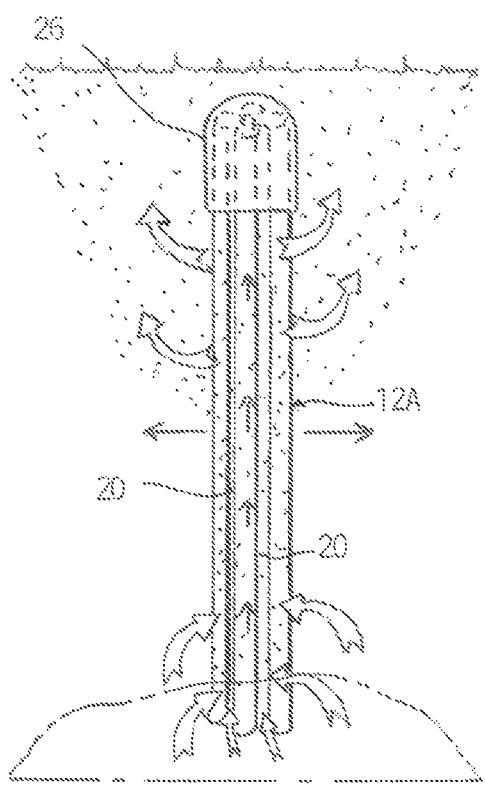
FIG. 5 is a diagram of moisture vapor flow patterns around and up a channel member installed in dry soil.

Column 4, line 11 after "soil as" insert -- shown in Figures 3 and 5. The soil over the upper ends filters out any debris in the water draining into the members 12A. --.

Signed and Sealed this
Third Day of December, 2013

Margaret A. Focarino
*Commissioner for Patents of the United States Patent and Trademark Office*

UNITED STATES PATENT AND TRADEMARK OFFICE
CERTIFICATE OF CORRECTION

PATENT NO.         : 8,562,250 B2                                         Page 1 of 1
APPLICATION NO.    : 12/757115
DATED              : October 22, 2013
INVENTOR(S)        : Andrew Niemczyk It is certified that error appears in the above-identified patent and that said Letters Patent is hereby corrected as shown below:

In the Claims

Claim 2, Column 6, line 19, delete "pumping/drainage".
Claim 10, Column 6, line 51, delete "each channel feature".
Claim 10, Column 6, line 60, delete "extending".
Claim 16, Column 8, line 13, delete "chan-".
Claim 16, Column 8, line 14, delete "nel" and insert -- drainage --.
Claim 17, Column 8, line 16, delete "pumping/drainage" and insert -- drainage --.

Signed and Sealed this
Twenty-ninth Day of April, 2014

Michelle K. Lee
*Deputy Director of the United States Patent and Trademark Office*